C. S. KELLUM.
PETCOCK AND METHOD OF MAKING SAME.
APPLICATION FILED SEPT. 18, 1919.
1,367,605.
Patented Feb. 8, 1921.
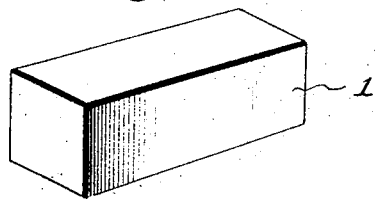
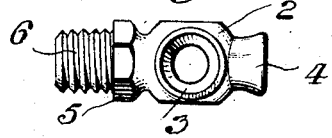
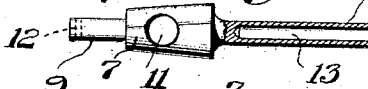
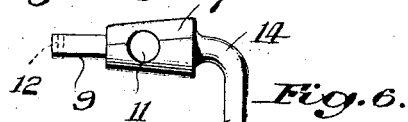
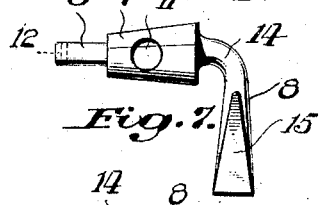
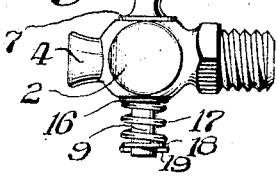
INVENTOR
Charles S. Kellum
BY
ATTORNEYS

UNITED STATES PATENT OFFICE.

CHARLES S. KELLUM, OF DETROIT, MICHIGAN.

PETCOCK AND METHOD OF MAKING SAME.

1,367,605.  Specification of Letters Patent.  Patented Feb. 8, 1921.

Application filed September 18, 1919. Serial No. 324,265.

*To all whom it may concern:*

Be it known that I, CHARLES S. KELLUM, a citizen of the United States of America, residing at Detroit, in the county of Wayne and State of Michigan, have invented certain new and useful Improvements in Petcocks and Methods of Making Same, of which the following is a specification, reference being had therein to the accompanying drawings.

As far as I am aware, pet cocks and small valves have the bodies and plugs thereof cast from metal and consequently the pet cocks, particularly the plug handles or stems thereof, are susceptible to breakage and when broken such a pet cock is generally discarded.

My invention aims to reduce the breakage of pet cocks or similar valves to a minimum, by forming a valve from malleable metal which will bend before breaking, and in so forming a pet cock I produce a better article, which is not only better in the particular mentioned above, but provides a nonleakable and more closely fitted article which has a better appearance.

In making the article from malleable metal, in contradistinction to cast metal, a method is involved and this method, together with the article, will be hereinafter considered and then claimed.

Reference will now be had to the drawing, wherein—

Figure 1 is a perspective view of a piece of stock from which a pet cock body is formed;

Fig. 2 is a plan of a finished pet cock body;

Fig. 3 is a perspective view of a piece of stock from which a pet cock plug is formed;

Fig. 4 is a plan of a partly finished pet cock plug;

Fig. 5 is a side elevation of the same, partly broken away and partly in section, illustrating another step in the method of completing the pet cock plug;

Fig. 6 is a similar view showing another step in the method of making the plug;

Fig. 7 is a similar view showing the plug complete, and

Fig. 8 is a side elevation of the body and plug assembled to provide a complete pet cock.

In the drawing, 1 denotes a piece of stock that is cut to proper size and preferably made of brass or other malleable metal capable of being machined or turned down, the stock or body when ready for such an operation being rectangular and of a defined cross sectional area. The piece of stock is placed in a lathe or automatic machine and turned down to form a pet cock or valve body 2 that has flat facets with a tapering plug seat 3 extending from one facet to an opposite facet. One end of the body is formed to provide a nozzle or outlet member 4 and the opposite end of the body is formed to provide a nut 5 and a nipple 6, both of which represent the inlet end of the body. The body thus formed has an accurate and symmetrical finish and it is practically impossible to break the same during ordinary usage.

The plug which is placed on the tapering seat 3 of the body 2 is also made from a solid piece of stock, which instead of being rectangular is in the form of a solid cylinder or member 10, as shown in Fig. 3, and this piece of stock is placed in a lathe or automatic machine and turned down to provide a tapering plug body 7, a handle stem 8 at one end thereof, and a retaining stem 9 at the opposite end of the plug body. In machining or turning down a piece of stock to produce the blank shown in Fig. 4, it is possible to finish the plug body 7 so that it will accurately fit in the body 2 and require no further operations after having been so formed in order to insure a proper fitting.

The next step involved in the method is that of drilling or boring out the plug body 7 to provide the usual port 11 and a smaller drill is employed for providing the retaining stem 9 with a transverse opening 12 and the handle stem 8 with a longitudinal bore 13, said bore extending from the outer end of the handle stem to a point in proximity to the large end of the plug body 7. Since the handle stem 8 is now hollow for the greater part of its length the next step in the method can be easily carried on, namely, that of bending the hollow handle stem at an angle to the axis of the plug body 7, as shown in Fig. 6. The bend takes place at approximately the inner end of the bore 13, and this is accomplished in a press or by a suitable machine without any danger of the handle stem cracking or splitting during such operation. The same machine may be employed for further finishing the handle stem 8, which now has its outer end flattened, as at 15 so as to form a web extremity or handle. This operation is rendered extremely easy due to the fact that the walls of the hollow handle stem will easily collapse and when brought into abutting relation or contiguous to each other will afford a finger piece by which the plug may be rotated.

With the body and plug so formed, it is only necessary to place the plug on the seat 3 in the body 2, place a spring abutment or washer 16 on the retaining stem 9, then a coiled retractile spring 17, then another spring abutment or washer 18, and finally a cotter or other pin 19 in the opening 12 of the retaining stem 9. The pet cock or valve is then assembled, as shown in Fig. 8 and is ready to be installed.

What I claim is:—

1. A method of making valve plugs consisting of turning down a cylindrical member to form a plug body having a stem, drilling the stem of the plug body to make it hollow, bending the hollow stem, and then flattening the outer end of the hollow plug stem.

2. A method of making valve plugs consisting of turning down a cylindrical member to form a plug body having a stem, drilling the stem of the plug body to make it hollow and the plug body to provide a port, bending the hollow stem at an angle to the axis of the plug body, and then flattening the outer end of the hollow bent plug stem to form a handle.

In testimony whereof I attach my signature in the presence of two witnesses.

CHARLES S. KELLUM.

Witnesses:
 ANNA M. DORR,
 KARL H. BUTLER.